(12) United States Patent
Aarre

(10) Patent No.: US 11,988,790 B2
(45) Date of Patent: May 21, 2024

(54) RESIDUAL SIGNAL DETECTION FOR NOISE ATTENUATION

(71) Applicant: Schlumberger Technology Corporation, Sugar Land, TX (US)

(72) Inventor: Victor Aarre, Stavanger (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 375 days.

(21) Appl. No.: 17/310,071

(22) PCT Filed: Jan. 14, 2020

(86) PCT No.: PCT/US2020/013495
§ 371 (c)(1),
(2) Date: Jul. 15, 2021

(87) PCT Pub. No.: WO2020/150223
PCT Pub. Date: Jul. 23, 2020

(65) Prior Publication Data
US 2022/0050222 A1 Feb. 17, 2022

Related U.S. Application Data

(60) Provisional application No. 62/792,513, filed on Jan. 15, 2019.

(51) Int. Cl.
*G01V 1/36* (2006.01)
*G06T 5/20* (2006.01)
(Continued)

(52) U.S. Cl.
CPC .............. *G01V 1/364* (2013.01); *G06T 5/20* (2013.01); *G06T 5/50* (2013.01); *G06T 5/70* (2024.01);
(Continued)

(58) Field of Classification Search
CPC ........ G01V 1/282; G01V 1/364; G01V 1/345; G01V 1/50; G01V 1/30; G01V 2210/324;
(Continued)

(56) References Cited

U.S. PATENT DOCUMENTS 4,809,238 A * 2/1989 Bishop ................... G01V 1/364
367/45
11,061,156 B2 * 7/2021 Machovoe ............. G01V 1/288
(Continued)

FOREIGN PATENT DOCUMENTS

CN 108876737 A * 11/2018 ............... G06N 3/08
CN 108876737 A 11/2018
(Continued)

OTHER PUBLICATIONS

Extended Search Report issued in European Patent Application No. 20741691.8 dated Sep. 9, 2022, 8 pages.
(Continued)

*Primary Examiner* — Ian L Lemieux
*Assistant Examiner* — Woo C Rhim
(74) *Attorney, Agent, or Firm* — Jeffrey D. Frantz

(57) ABSTRACT

A method for processing an image includes receiving an input image including a signal and noise, and generating a filtered image based on the input image by removing at least a portion of the noise from the input image. A portion of the signal is also removed from the input image. The method further includes generating a residual image based on the input image. The residual image comprises the at least a portion of the noise and the portion of the signal that are removed from the input image to generate the filtered image. The method also includes identifying at least some of the portion of the signal that is in the residual image, and inserting the at least some of the portion of the signal identified in the residual image into the filtered image.

18 Claims, 14 Drawing Sheets

(51) Int. Cl.
*G06T 5/50* (2006.01)
*G06T 5/70* (2024.01)
*G01V 1/34* (2006.01)

(52) U.S. Cl.
CPC .......... *G01V 1/34* (2013.01); *G01V 2210/324* (2013.01); *G06T 2207/20081* (2013.01); *G06T 2207/20084* (2013.01)

(58) Field of Classification Search
CPC ........ G01V 2210/32; G01V 1/28; G01V 1/48; G01V 1/34; G06N 3/08; G06N 20/00; G06N 3/02; G06N 3/045; E21B 47/14; E21B 2200/22; G06T 5/002; G06T 2207/20084; G06T 2207/20081; G06T 2207/30181; G06T 2207/20221; G06T 5/20; G06T 5/50; G06T 2207/10032; G06T 2207/20024; G06T 2207/20182; G06V 10/82; G06V 10/30
See application file for complete search history.

(56) References Cited

U.S. PATENT DOCUMENTS

| | | | | |
|---|---|---|---|---|
| 11,598,892 | B2* | 3/2023 | Eckersley | G06F 30/27 |
| 2010/0027848 | A1* | 2/2010 | Al-Dossary | G01V 1/362 |
| | | | | 382/109 |
| 2011/0141322 | A1* | 6/2011 | Kim | G06T 5/20 |
| | | | | 348/241 |
| 2011/0218737 | A1* | 9/2011 | Gulati | G01V 1/30 |
| | | | | 345/419 |
| 2011/0268328 | A1* | 11/2011 | Bar-Aviv | G06T 5/002 |
| | | | | 382/128 |
| 2012/0188408 | A1* | 7/2012 | Nakaoka | H04N 25/702 |
| | | | | 348/345 |
| 2015/0110360 | A1* | 4/2015 | Zhao | G01V 1/362 |
| | | | | 382/109 |
| 2015/0241584 | A1* | 8/2015 | Aarre | G01V 1/36 |
| | | | | 367/7 |
| 2015/0285931 | A1* | 10/2015 | Keskes | G01V 1/301 |
| | | | | 382/109 |
| 2016/0098821 | A1* | 4/2016 | Lee | G06T 5/002 |
| | | | | 382/260 |
| 2016/0161621 | A1* | 6/2016 | Salama | G01V 1/364 |
| | | | | 702/17 |
| 2016/0363681 | A1* | 12/2016 | Boiero | G01V 1/36 |
| 2020/0104745 | A1* | 4/2020 | Li | H04Q 9/00 |
| 2020/0134365 | A1* | 4/2020 | Liu | G06V 10/806 |

FOREIGN PATENT DOCUMENTS

| | | | | |
|---|---|---|---|---|
| EP | | 1554607 B | 7/2013 | |
| EP | | 1554607 B1 * | 7/2013 | ............ G01V 1/28 |
| WO | WO-2016168280 A1 * | | 10/2016 | ............ G01V 1/325 |
| WO | WO-2018148492 A1 * | | 8/2018 | ............ G01V 1/282 |

OTHER PUBLICATIONS

Chen and Fomel, "Random noise attenuation using local signal-and-noise orthogonalization", Geophysics, vol. 80, No. 6, Nov.-Dec. 2015, pp. WD1-WD9 (9 pages total).

International Search Report and Written Opinion of the equivalent International Patent Application No. PCT/US2020/013495 dated Mar. 16, 2020, 9 pages.

International Preliminary Report on Patentability of the equivalent International Patent Application No. PCT/US2020/013495 dated Jul. 29, 2021, 7 pages.

* cited by examiner

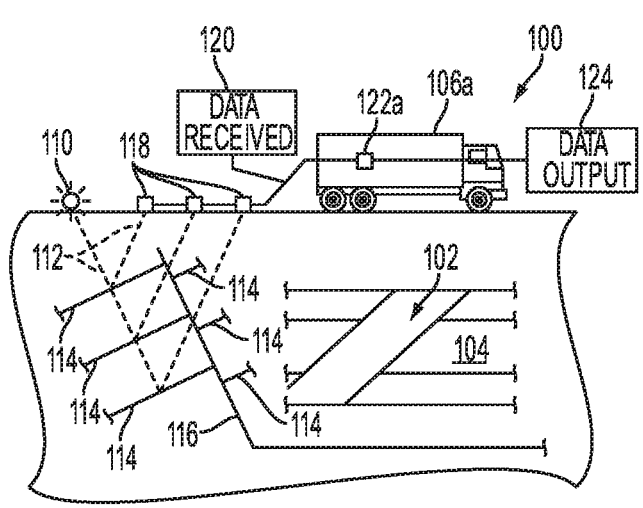
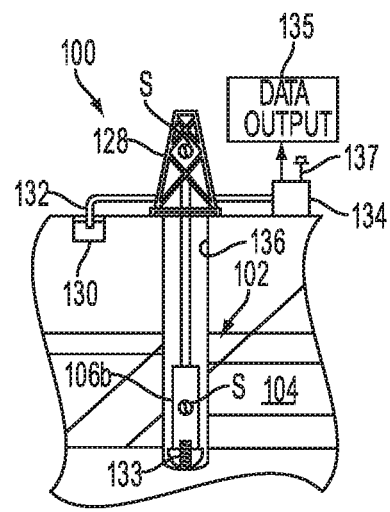
FIG. 1A    FIG. 1B
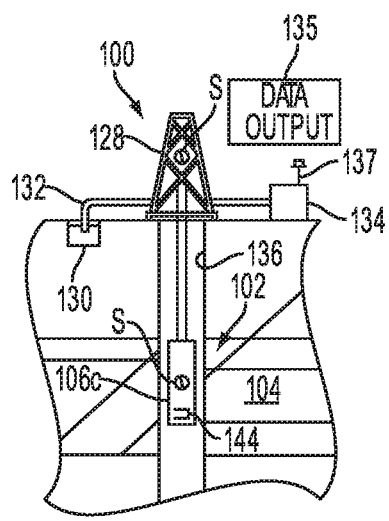
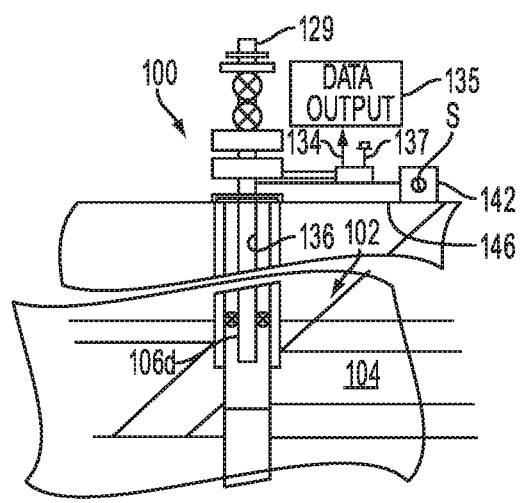
FIG. 1C    FIG. 1D

600 ⟶

650 ⟶

800 ⟶

900 ⟶

RESIDUAL SIGNAL DETECTION FOR NOISE ATTENUATION

CROSS-REFERENCE TO RELATED APPLICATIONS

This application is a National Stage Entry of International Application No. PCT/US2020/013495, filed on Jan. 14, 2020, which claims priority to U.S. Provisional Patent application having Ser. No. 62/792,513, which was filed on Jan. 15, 2019 and is incorporated herein by reference in its entirety.

BACKGROUND

Seismic signals are employed to determine a structure of a subterranean volume, in a process known as inversion. However, seismic signals generally include noise (coherent or incoherent), which may be generated from many different possible sources. Noise can impair the inversion process, making it difficult to accurately characterize the subterranean volume.

Accordingly, a variety of techniques and processes for attenuating noise in seismic signals have been developed. For example, filters may be constructed and applied to seismic signals to remove noise therefrom. Aggressive filters may successfully increase signal-to-noise ratio, but such filters may also remove some of the signal along with the noise. For example, part of the signal may be smeared in ambient random (or coherent) noise, and may be removed along with the noise. As a result, the signal remaining after the noise (and some of the signal) is removed may include discontinuities and artifacts that do not represent the structure of the subterranean domain.

SUMMARY

Embodiments of the present disclosure may provide a method for processing an image. The method includes receiving an input image including a signal and noise, and generating a filtered image based on the input image by removing at least a portion of the noise from the input image. A portion of the signal is also removed from the input image. The method further includes generating a residual image based on the input image. The residual image comprises the at least a portion of the noise and the portion of the signal that are removed from the input image to generate the filtered image. The method also includes identifying at least some of the portion of the signal that is in the residual image, and inserting the at least some of the portion of the signal identified in the residual image into the filtered image.

In an embodiment, generating the filtered image comprises applying a filter to the input image.

In an embodiment, identifying at least some of the portion of the signal in the residual image includes applying a statistical model to the residual image to identify the at least a portion of the signal.

In an embodiment, identifying the at least some of the portion of the signal in the residual image includes applying a machine-learning model to the residual image to identify the portion of the signal.

In an embodiment, the method also includes training the machine-learning model using a training corpus of images. In an embodiment, training the machine-learning model includes labeling one or more portions of the images of the training corpus as representing at least part of a signal. In an embodiment, the images are generated based on data recorded using one or more seismic receivers.

In an embodiment, the method includes generating the training corpus synthetically, which includes generating a training image comprising noise, inserting a coherent shape into the training image, and labeling individual discrete elements of the training image as including either noise or a part of the coherent shape.

In an embodiment, the training corpus is a first training corpus, and the method further includes generating a second training corpus using seismic images generated based on data recorded using seismic receivers, and training the machine-learning model using the second training corpus.

In an embodiment, the method further includes detecting one or more discontinuities in the filtered image that are or would be caused by inserting the at least some of the portion of the signal into the filtered image, and adjusting the filtered image or the at least some of the portion of the signal to mitigate the one or more discontinuities.

In an embodiment, the input image includes a seismic image representing a subterranean domain, and the filtered image represents the subterranean domain and has a higher signal-to-noise ratio than the input image.

Embodiments of the present disclosure may also provide a computing system including one or more processors, and a memory system including one or more non-transitory, computer-readable media storing instructions that, when executed by at least one of the one or more processors, cause the computing system to perform operations. The operations include receiving an input image including a signal and noise, and generating a filtered image based on the input image by removing at least a portion of the noise from the input image. A portion of the signal is also removed from the input image. The operations further include generating a residual image based on the input image. The residual image comprises the at least a portion of the noise and the portion of the signal that are removed from the input image to generate the filtered image. The operations also include identifying at least some of the portion of the signal that is in the residual image, and inserting the at least some of the portion of the signal identified in the residual image into the filtered image.

Embodiments of the present disclosure may also provide a non-transitory computer-readable medium storing instructions that, when executed by at least one processor of a computing system, causing the computing system to perform operations. The operations include receiving an input image including a signal and noise, and generating a filtered image based on the input image by removing at least a portion of the noise from the input image. A portion of the signal is also removed from the input image. The operations further include generating a residual image based on the input image. The residual image comprises the at least a portion of the noise and the portion of the signal that are removed from the input image to generate the filtered image. The operations also include identifying at least some of the portion of the signal that is in the residual image, and inserting the at least some of the portion of the signal identified in the residual image into the filtered image.

Embodiments of the present disclosure may further provide a computing system including means for receiving an input image including a signal and noise, and means for generating a filtered image based on the input image by removing at least a portion of the noise from the input image. A portion of the signal is also removed from the input image. The system further includes means for generating a residual image based on the input image. The residual image includes the at least a portion of the noise and the portion of the signal that are removed from the input image to generate the filtered image. The system also includes means for identifying at least some of the portion of the signal that is in the residual image, and means for inserting the at least some of the portion of the signal identified in the residual image into the filtered image.

Embodiments of the present disclosure may further provide a computing system configured to receive an input image including a signal and noise, and generate a filtered image based on the input image by removing at least a portion of the noise from the input image. A portion of the signal is also removed from the input image. The system is further configured to generate a residual image based on the input image. The residual image includes the at least a portion of the noise and the portion of the signal that are removed from the input image to generate the filtered image. The system is configured to identify at least some of the portion of the signal that is in the residual image, and to insert the at least some of the portion of the signal identified in the residual image into the filtered image.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DESCRIPTION OF EMBODIMENTS

Figure 2:
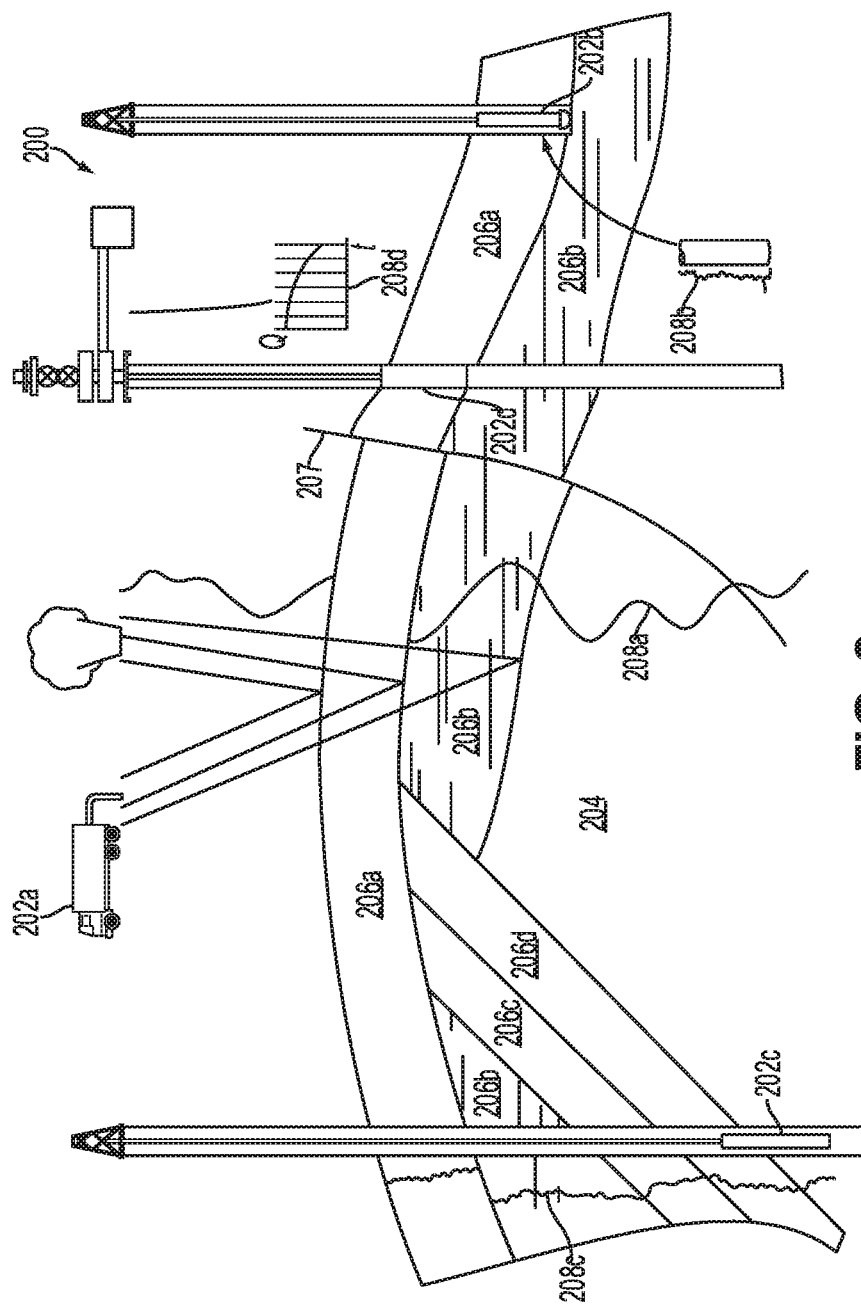

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1B. Wireline tool 106c is adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106c to measure downhole parameters which relate to, for example porosity, permeability, fluid composition and/or other parameters of the field operation.

FIG. 1D illustrates a production operation being performed by production tool 106d deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d generate data plots or measurements 208a-208d, respectively. These data plots are depicted along oilfield 200 to demonstrate the data generated by the various operations.

Data plots 208a-208c are examples of static data plots that may be generated by data acquisition tools 202a-202c, respectively; however, it should be understood that data plots 208a-208c may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208c is a logging trace that typically provides a resistivity or other measurement of the formation at various depths.

A production decline curve or graph 208d is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206.1 and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
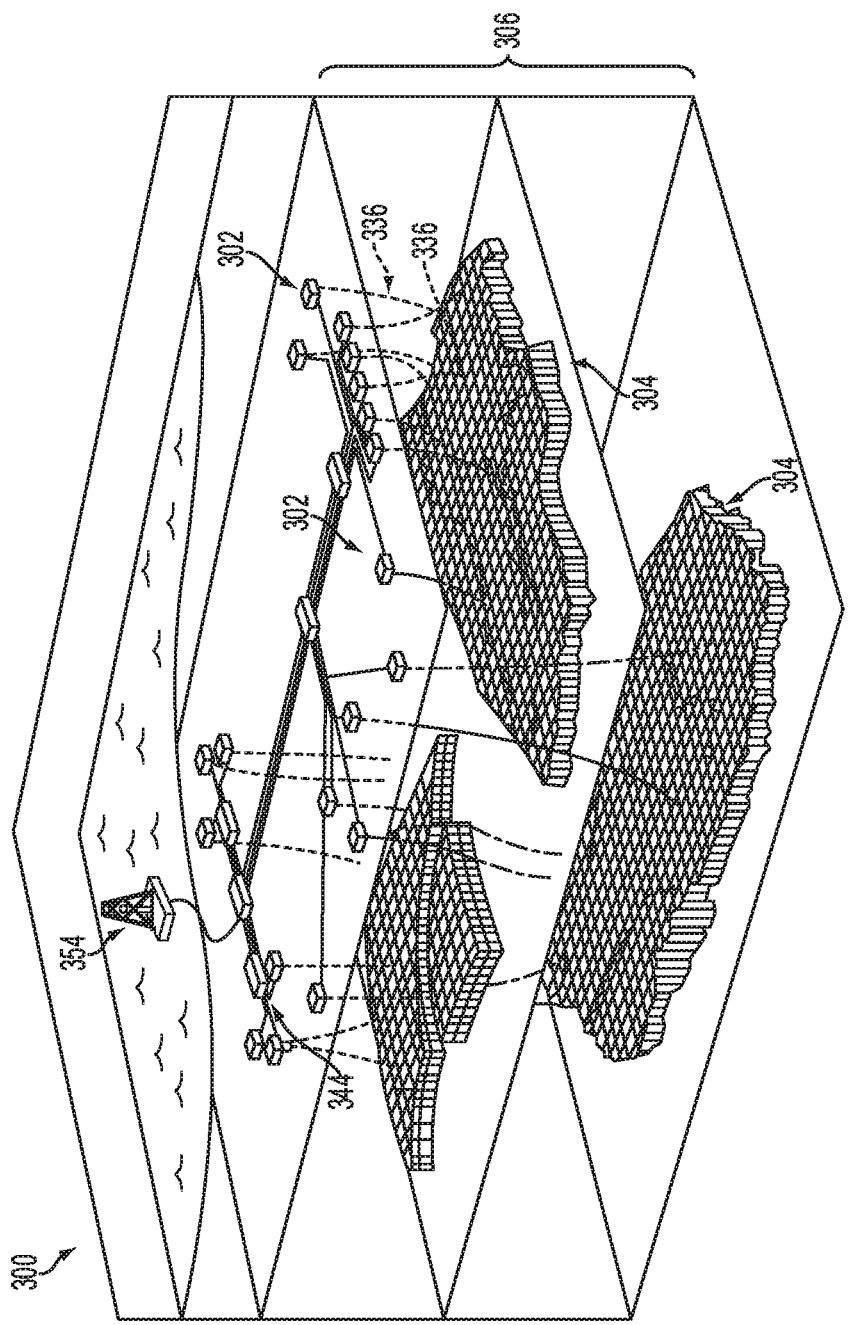

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
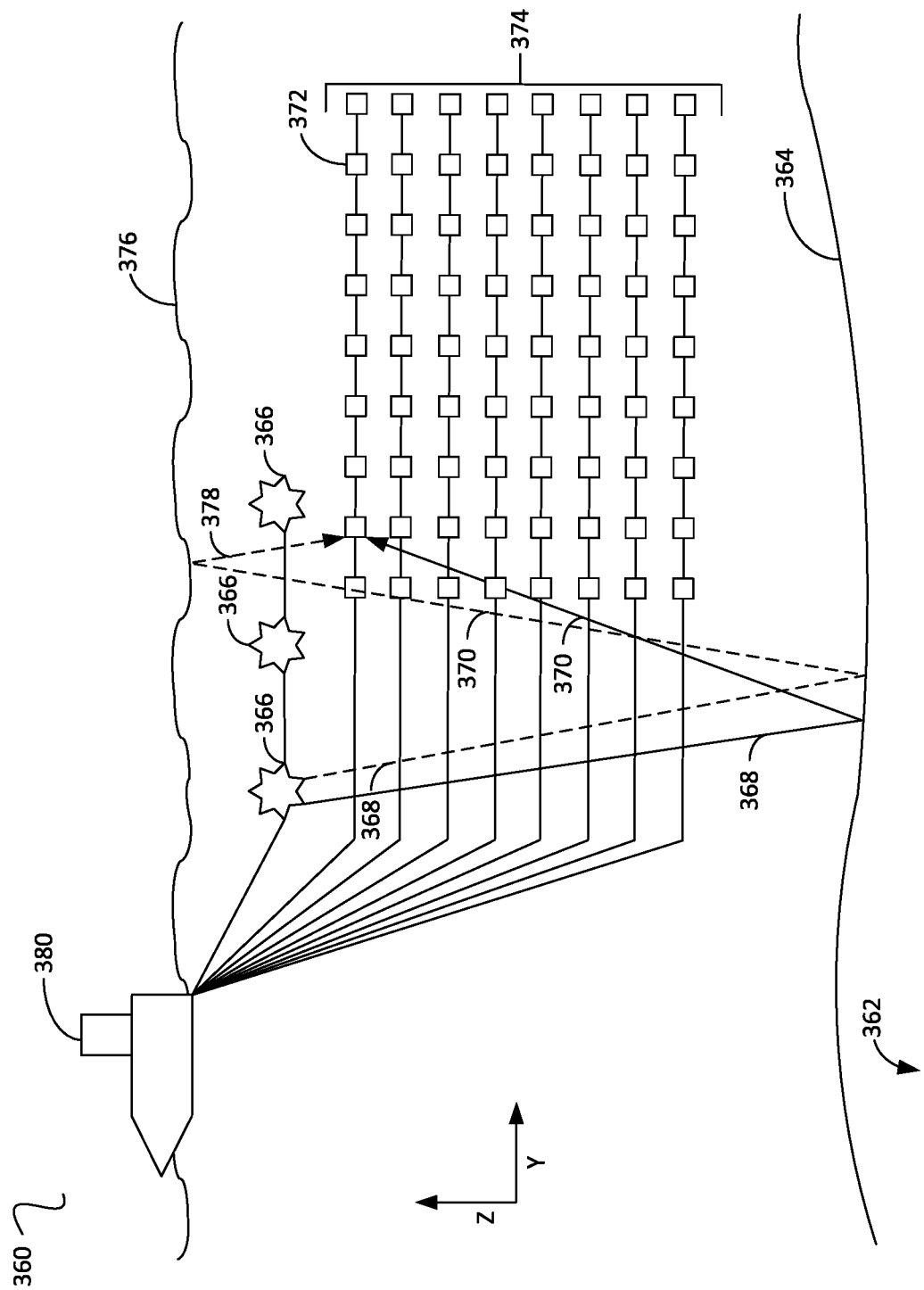

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
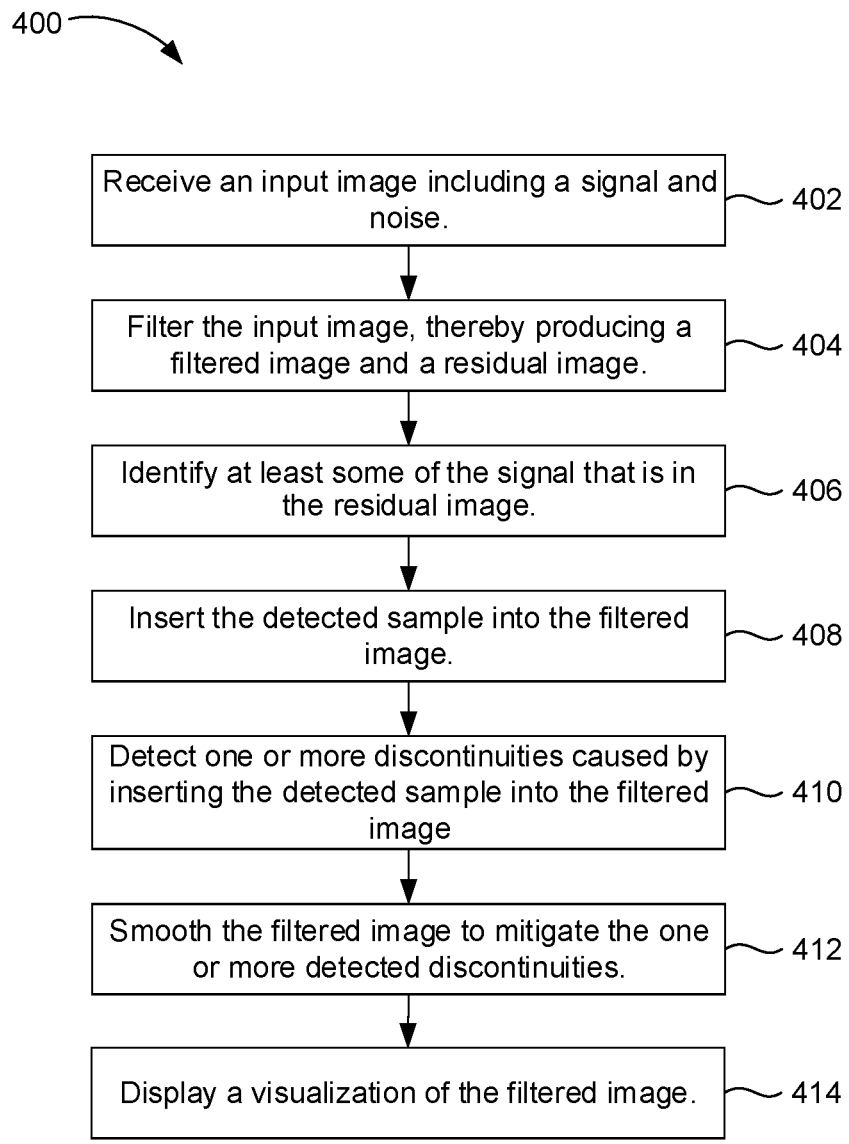
FIG. 4 illustrates a flowchart of a method for reducing noise in a seismic image, according to an embodiment.

FIG. 4 illustrates a flowchart of a method 400 for reducing noise in an image, according to an embodiment. It will be appreciated that the order of the worksteps of the method 400 shown in FIG. 4 and discussed below is merely an example. In other embodiments, the worksteps may be rearranged, subdivided into two or more worksteps, or two or more worksteps may be combined, performed in parallel, etc.

The method 400 may include receiving an input image, at 402. The input image may be a seismic image, which may represent a structure of a subterranean volume (or "domain"). In particular, the input image may include a signal that results from seismic waves propagating, reflecting, and refracting in the subterranean volume, as well as noise. In at least one embodiment, the seismic image may contain a plurality of signals in combination with the noise. The noise may be coherent or incoherent, and a single input image may include both coherent and incoherent noise.

The method 400 may also include filtering the input image, as at 404. Filtering the input image may include attenuating/removing at least a portion of the noise. Filtering may also cause removal of a portion of the signal from the seismic image. A filtered image may be produced from the input image by the filtering at 404. Any suitable type of filter for removing noise from a seismic signal may be employed, e.g. mean-squared filters, and/or the like. In various embodiments example, the noise and/or the signal may be attenuated using a deterministic and/or aggressive noise attenuation technique. The removed portions of the noise and the signal may produce a residual image, which may be generated before, at the same time as, or after the filtered image is generated. Thus, in some embodiments, the filtered seismic image plus the residual seismic image equals the original, input seismic image.

As a result of removing the noise in the filtering operation at 404, the signal-to-noise ratio of the filtered image may be greater than the signal-to-noise ratio of the input image. Further, in at least one embodiment, the amount of noise attenuated may be greater than the amount of signal attenuated. For example, the amount of noise attenuated may be from about 50% to about 100%, about 60% to about 95%, or about 70% to about 90%. The amount of signal attenuated may be from about 1% to about 50%, about 2% to about 40%, or about 3% to about 30%.

The method 400 may also include detecting at least some of the signal that was removed from the input image, e.g., that is in the residual image, as at 406. In some embodiments, such identification may be made at a pixel-by-pixel or voxel-by-voxel level (pixels and voxels are types of "discrete elements" in the images, as that term is used herein). Accordingly, one, some, or all of the individual discrete elements of a given residual image may be identified as either noise or signal.

The identification of the signal in the residual image may be conducted in any one or more of several manners. For example, a deterministic, hard-coded approach may be applied. In such case, rules may be established that determine waves to be "restored" (put back into the filtered image). For example, a two or three dimensional Fourier analysis to detect wave numbers to restore may be employed.

Machine-learning may be another approach that can be utilized to identify (at least some of) the signal that was removed from the input image at 406. For example, and as described in greater detail below, a machine-learning model may be trained using a suitable training corpus that allows a machine-learning model (e.g., a deep learning, convolutional neural network) to distinguish between signal and noise. Such training may be manual and/or supervised, employing a human domain expert to label a training corpus of images, or parts thereof, as representing signals rather than noise. In other embodiments, unsupervised training may be employed. Further, the training corpus of images may be actual seismic images generated using signals collected in a seismic survey (e.g., seismic receivers positioned in the field and configured to record seismic data). The training corpus may instead or additionally be synthetically generated, as will be described in greater detail below.

The method 400 may also include inserting the signal identified in the residual image (e.g., pixels and/or voxels) into the filtered seismic image, as at 408. Before or after such insertion at 408, the method 400 may include detecting one or more discontinuities caused by inserting the detected sample into the filtered image, as at 410. In some embodiments, this may be achieved by comparing values in the discrete elements that are to be (or that have been) inserted into the filtered image to the neighboring discrete elements. If the difference is above a threshold (or some other metric is met), a smoothing technique may be applied, as at 412, to mitigate or even avoid the detected discontinuities in the image, that would otherwise be caused by restoring the signal from the residual image into the filtered image. While smoothing may be applied in other contexts to correct for removed noise or signal components, it is noted that the smoothing applied at 412 corrects for discontinuities caused by seismic signal components that are first removed from an image, and then added back into the same image without the noise (e.g., not adding together two separate images or smoothing for removed portions).

Once the signal identified at 406 is inserted into the filtered image at 408 (and/or any corrections/smoothing are applied at 412), a visualization of the filtered image may be displayed, e.g., using a computer screen, as at 414. Additional seismic processing techniques may be applied to the filtered image, e.g., identification of various seismic attributes. As a result of having more signal in the filtered image, the signal-to-noise ratio of the filtered image may be increased by the inserting at 408. Further, the present filtered image, generated at least partially by restoring at least some of the seismic signal that is stripped out during noise filtering, represents an enhancement over other seismic images, as the filtered image generated using the method 400 may avoid the discontinuities and/or other artifacts seen in images produced by other techniques. As such, both the method 400 and the filtered image generated thereby represent an enhancement in the seismic processing field and in the subterranean exploration field.

Figure 5:
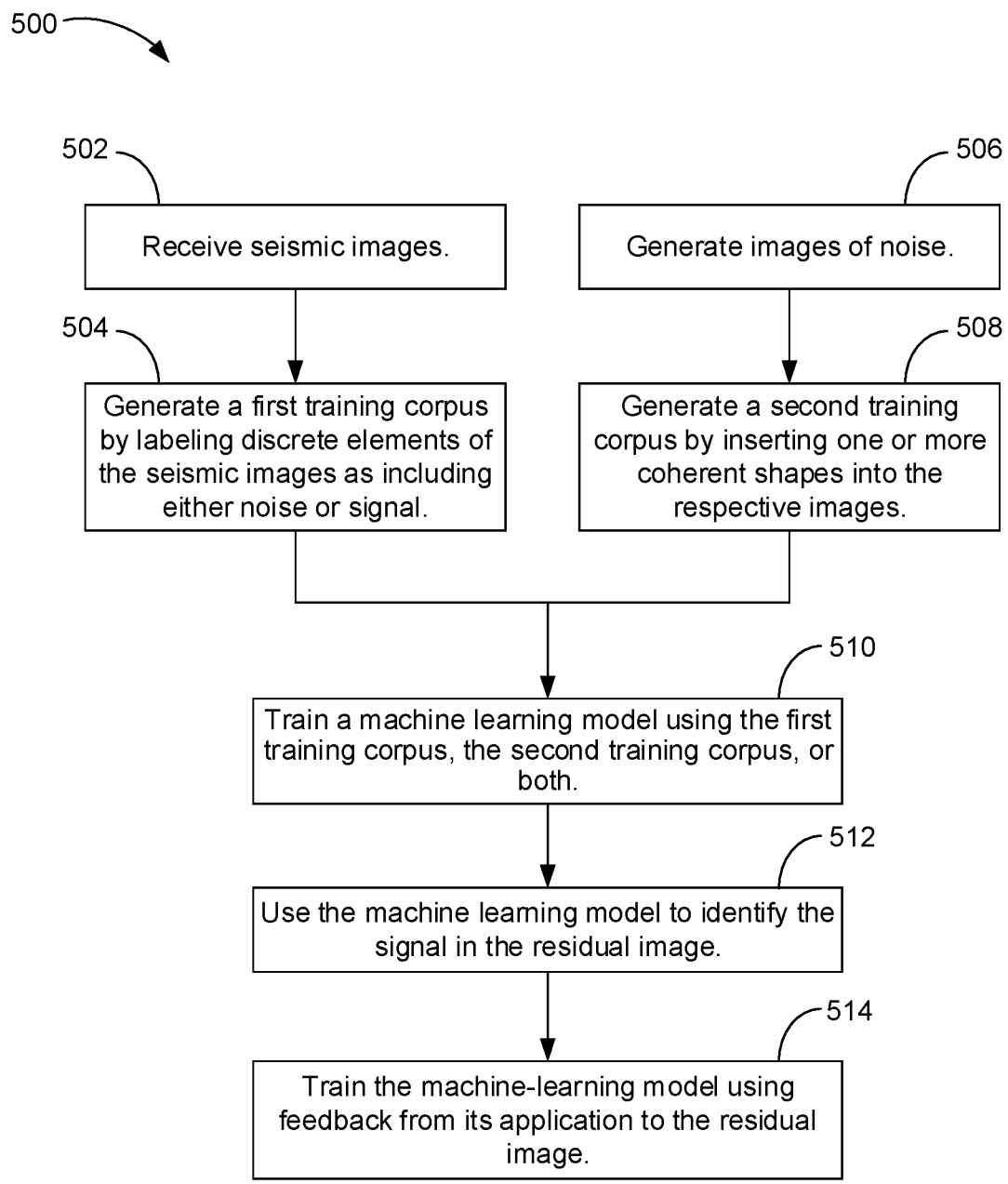
FIG. 5 illustrates a flowchart of a method for training and applying a machine-learning model to identify a portion of a signal in a residual image, according to an embodiment.

FIG. 5 illustrates a flowchart of a method 500 for using a machine-learning (ML) model to generate the filtered image, according to an embodiment. It will be appreciated that the order of the worksteps of the method 500 shown in FIG. 5 and discussed below is merely an example. In other embodiments, the worksteps may be rearranged, subdivided into two or more worksteps, or two or more worksteps may be combined, performed in parallel, etc.

The method 500 may be integrated into at least a portion of the method 400 discussed above, e.g., the ML model may be trained to identify the signal in the residual image at 406, as will be appreciated from the following description.

The ML model may employ one or more training corpuses of data, either of which may be employed prior to application of the ML model to actual seismic input images and/or after to improve the accuracy of the ML model. For example, a first training corpus may be constructed based on actual seismic images, which may be received at 502. The seismic images may be generated based on data recorded using one or more seismic receivers deploying the field and may represent an actual subterranean volume.

The method 500 may also include generating the first training corpus by labeling discrete elements of the seismic images as including either noise or signal, as at 504. This labeling may be done, for example, by human users, e.g., domain experts in the field of seismic interpretation. The seismic images fed to the domain experts may have a filtering process applied thereto, prior to reaching the domain experts. The task of the human domain experts may be facilitated using interactive software that may allow the user to identify areas where signal is apparent, e.g., by highlighting, circling, clicking, etc., in the image, with the software being configured to interpret such input from the human expert as an identification of particular voxels, pixels, or other discrete elements of the image.

The method 500 may also or instead including synthetically generating a second training corpus (this will be referred to herein as a "second" training corpus, but it will be understood that, in some embodiments, the first training corpus may be omitted). For example, the method 500 may include generating images of noise, as at 506. The noise may be random, coherent, or otherwise created according to a model of noise that would be expected to be seen in seismic signals. The method 500 may also include generating the second training corpus by inserting one or more coherent shapes (e.g., lines, curves, sinusoidal elements, etc.) into the image, as at 508. As such, the resulting images of the second training corpus may represent mostly noise, with some signal therein, as would be expected after application of an aggressive filter to a seismic input image.

With the synthetically-generated, second training corpus, the location (e.g., identification of discrete elements in the image) of the coherent shapes (representing the signal) may be known a priori, as having been recorded during the process of generating the training images. Accordingly, a human domain expert manually picking the location of the signals may be omitted from the creation of the second training corpus. Further, the shapes that are inserted may provide a wide representation of the different types of shapes that are expected to be seen in the seismic signals, such that the ML model may be trained to pick the various different types of shapes.

The method 500 may then train the ML model using either or both of the first and/or second training corpuses, as at 510. While some embodiments may employ the first training corpus and not the second training corpus, or vice versa, some embodiments of the method 500 may employ both the first and second training corpuses. For example, the first training corpus may robustly represent actual shapes that are seen in real instances of residual images, while the second training corpus may be able to quickly provide many more training images.

Once the ML model is trained, it may be employed to identify some or all of the signal in the residual image, as at 512. Further, additional training of the ML model may occur at 514, during application of the model to the residual image, e.g., by having a human user (e.g., domain expert) review the prediction of the signal by the ML model for accuracy, and updating the ML model in response.

Figure 6A:
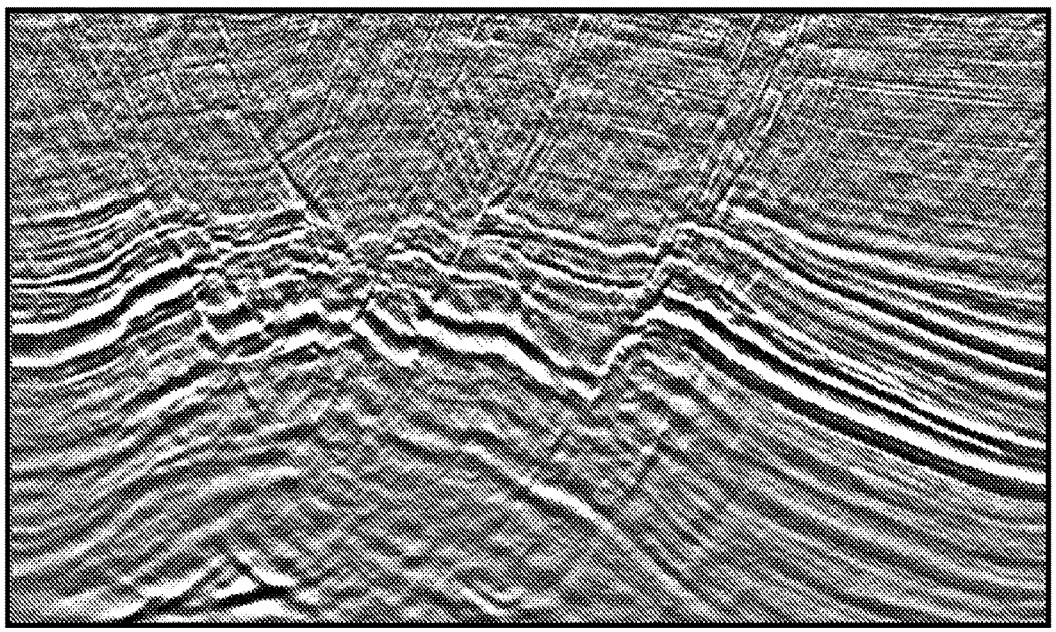
FIG. 6A illustrates an input seismic image (e.g., a seismic 2D vertical section), according to an embodiment.

FIG. 6A illustrates an image 600 of an input seismic image (e.g., a 2D vertical section), according to an embodiment. The image 600 may include near-vertical linear noise superimposed on top of the real signal (e.g., representing the underlying geology). There are also some real near-vertical signals, which are imaging/expressing the presence of one or more faults.

Figure 6B:
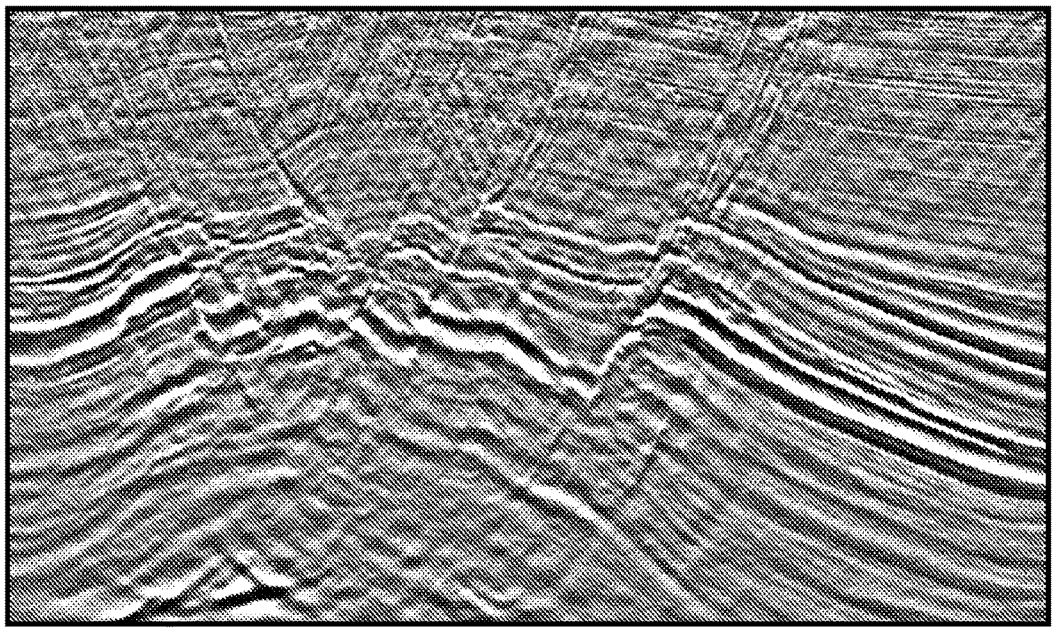
FIG. 6B illustrates a filtered seismic image produced by applying a noise attenuation filter to the input seismic image, according to an embodiment.

FIG. 6B illustrates an image 650 of a filtered seismic image (i.e., the input seismic image with a noise attenuation filter applied thereto), according to an embodiment. At least a portion of the near-vertical linear noise is removed by the filter; however, at least some of the "real" signal has also been removed.

Figure 7:
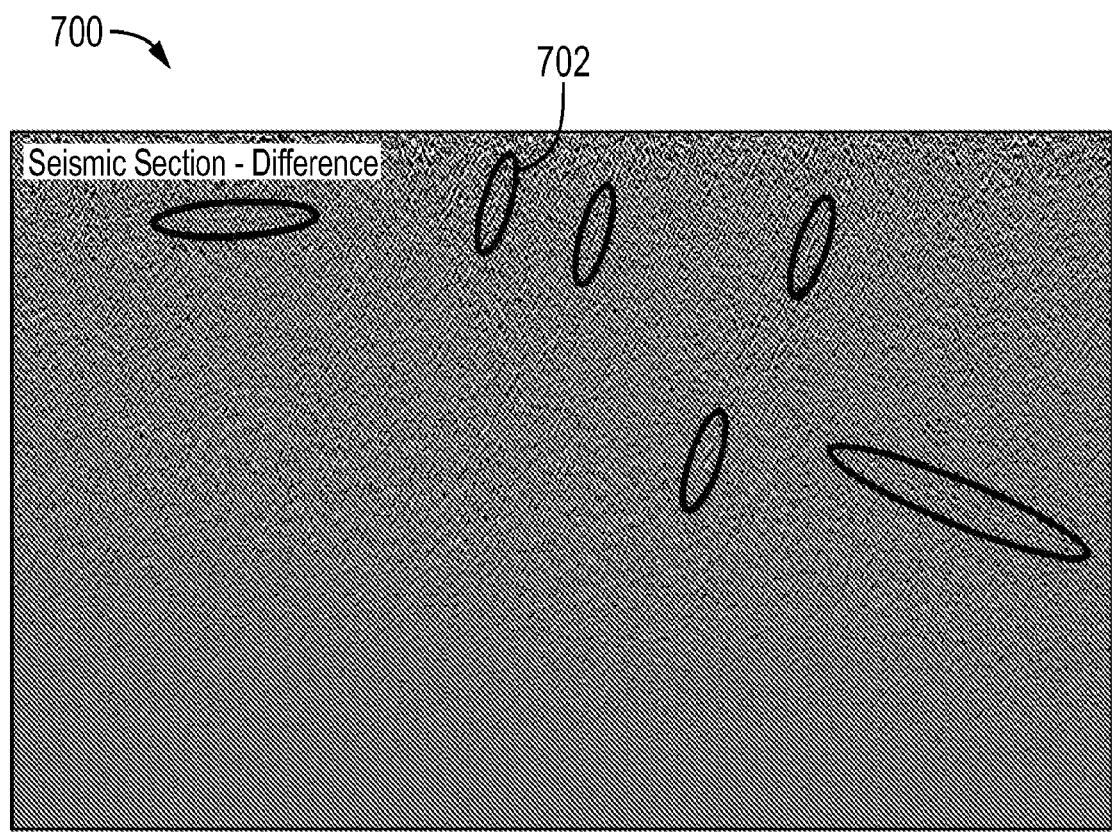
FIG. 7 illustrates a residual image including the portions of the input seismic image removed by the noise attenuation filter, according to an embodiment.

FIG. 7 illustrates a residual image 700 including the portions of the input seismic image (e.g., noise and/or signal) removed by the noise attenuation filter used to generate the image 650 from the image 600, according to an embodiment. In other words, the image 700 shows the portions of the image 600 that were removed to produce the image 650. The ovals 702 indicate signal which has been removed by the filter. According to the method(s) 400 and/or 500 discussed above, the signal portions 702 may be detected in the residual image 650. The detected signal portions (e.g., identified by discrete elements such as pixels) 702 may then be added back into the filtered seismic image 600 to generate a final image with an increased signal-to-noise ratio.

Figure 8:
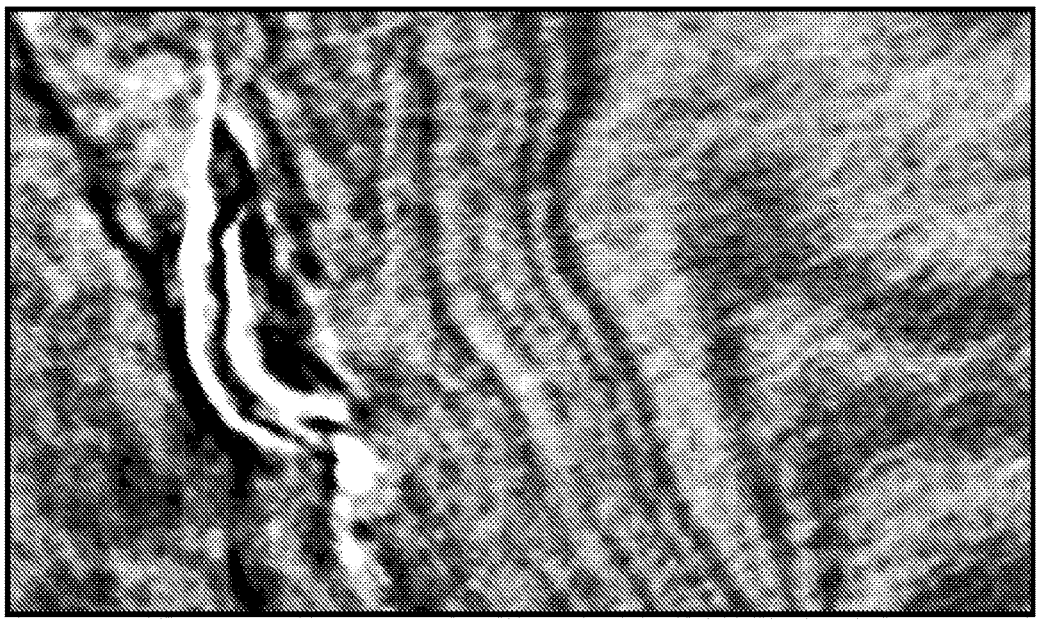
FIG. 8 illustrates another input seismic image (e.g., a seismic 2D time/depth slice), according to an embodiment.
Figure 9:
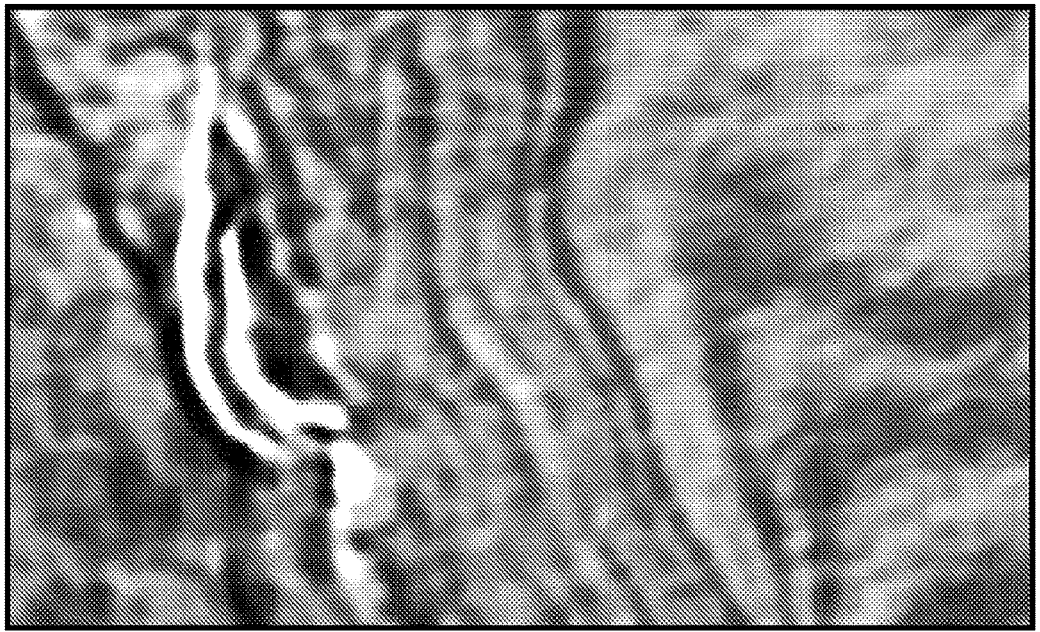
FIG. 9 illustrates a filtered seismic image produced by applying a noise attenuation filter to the input seismic image, according to an embodiment.
Figure 10:
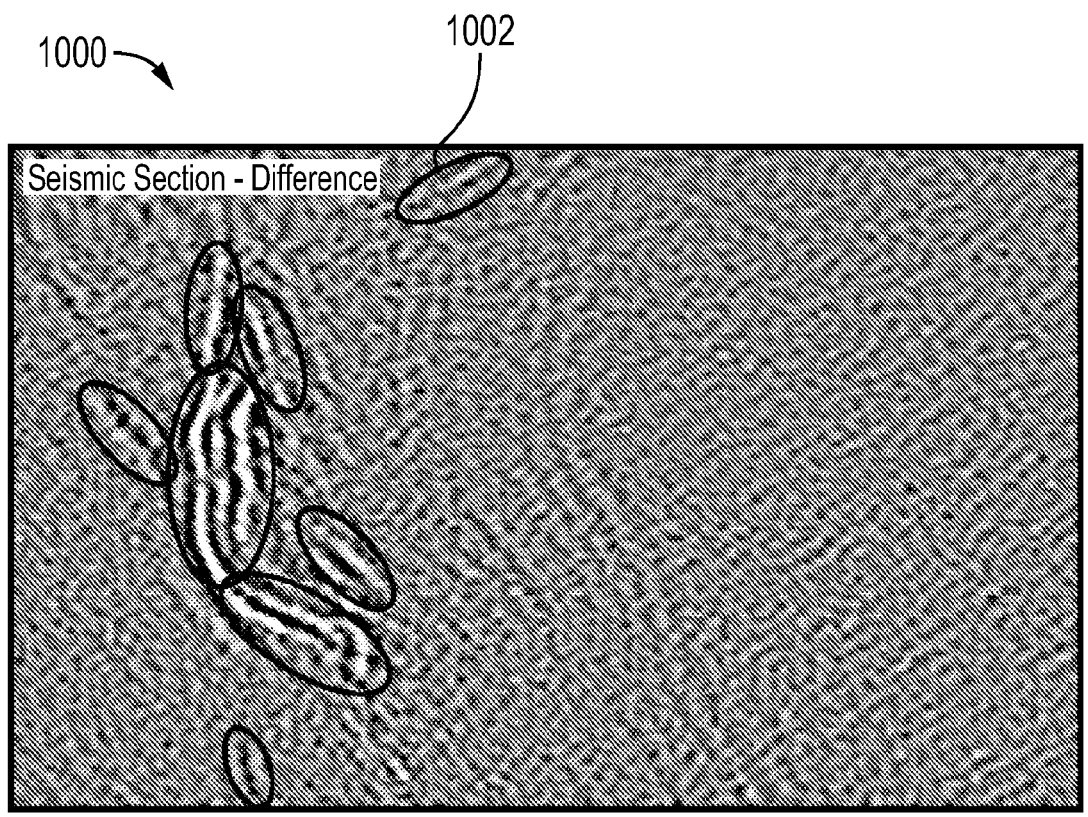
FIG. 10 illustrates a residual image including the portions of the input seismic image removed by the noise attenuation filter, according to an embodiment.

FIG. 8 illustrates another input seismic image 800 (e.g., a seismic 2D time/depth slice), according to an embodiment. FIG. 9 illustrates a filtered seismic image 900 produced by applying a noise attenuation filter to the input seismic image 800, according to an embodiment. FIG. 10 illustrates a residual image 1000 including the portions of the input seismic image 800 removed by the noise attenuation filter, according to an embodiment. As will be appreciated, FIGS. 8-10 are similar to FIGS. 5-7, with the difference being the type of input image used. Accordingly, the ovals 1002 indicate signal that was removed from the image 800 to generate the image 900, which may be identified and inserted into the filtered image.

Figure 11A:
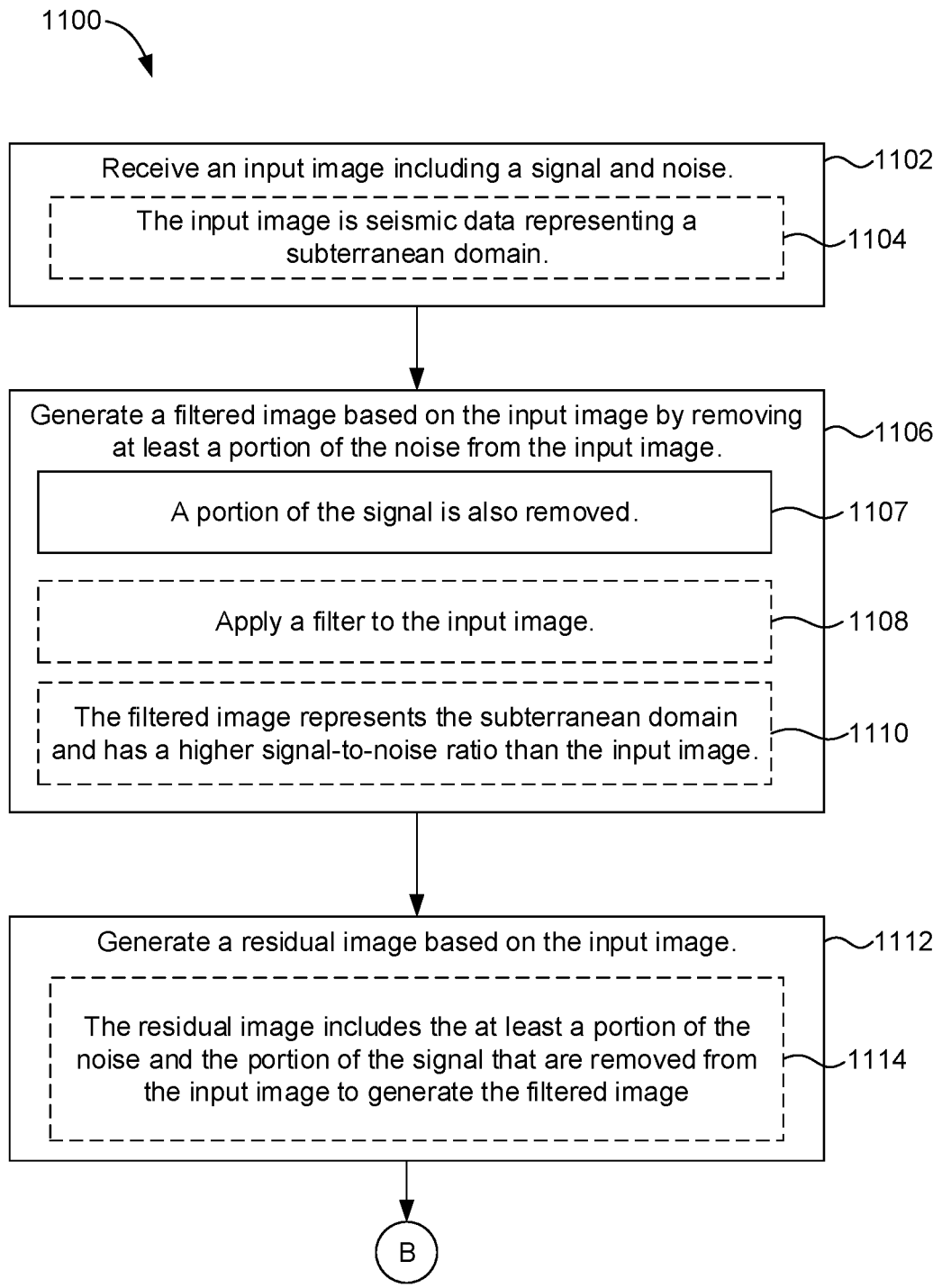
FIGS. 11A, 11B, and 11C illustrate a flowchart of a method for signal processing, according to an embodiment.
Figure 11B:
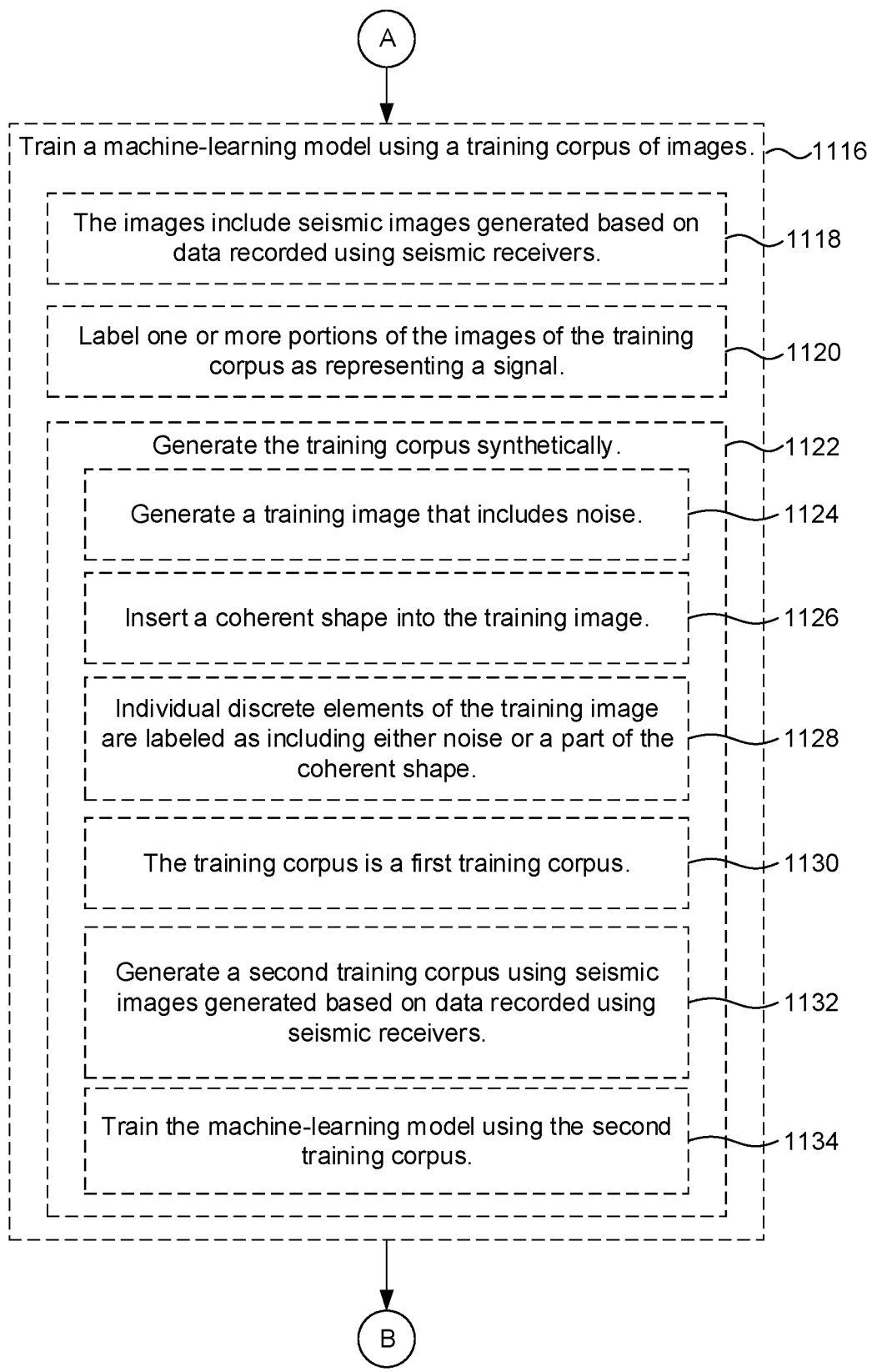
Figure 11C:
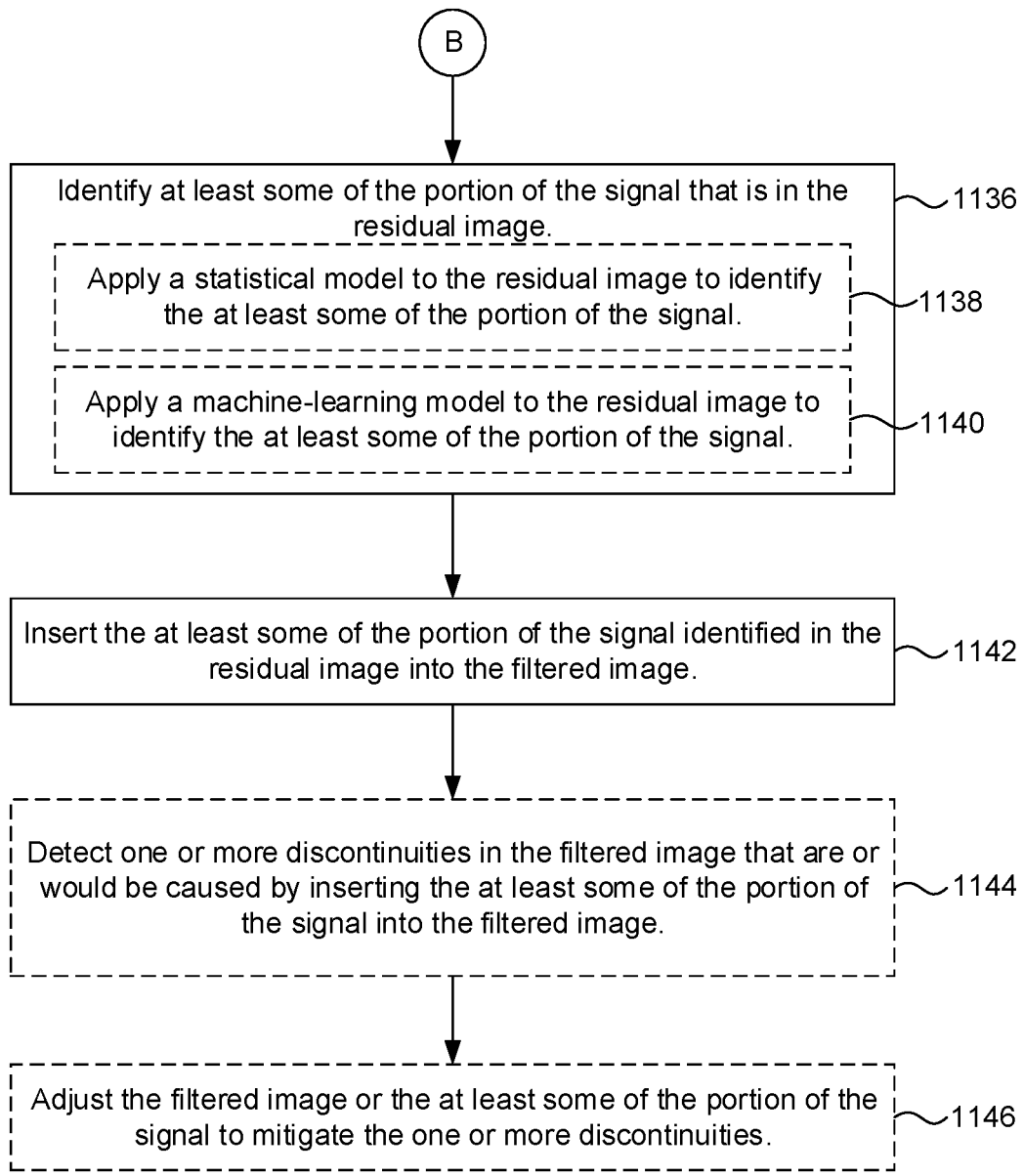

FIGS. 11A, 11B, and 11C illustrate a flowchart of a method 1100 for processing an image, according to an embodiment. It will be appreciated that the order of the worksteps of method 1100 discussed below is merely an example. In other embodiments, the worksteps may be rearranged, subdivided into two or more worksteps, or two or more worksteps may be combined, performed in parallel, etc.

The method 1100 may include receiving an input image including a signal and noise, as at 1102 (e.g., FIG. 4, block 402). In an embodiment, the input image may be seismic data representing a subterranean domain, as at 1104.

The method 1100 may also include generating a filtered image based on the input image by removing at least a portion of the noise from the input image, as at 1106 (e.g., FIG. 4, block 404). A portion of the signal may also be removed from the input image by such filtering, as at 1107 (e.g., FIG. 4, block 404). In an embodiment, generating the filtered image may include applying a filter to the input image, as at 1108 (e.g., FIG. 4, block 404). In an embodiment, the filtered image represents the subterranean domain and has a higher signal-to-noise ratio than the input image, as at 1110.

The method 1100 may further include generating a residual image based on the input image, as at 1112 (e.g., FIG. 4, block 404). As indicated at 1114, the residual image includes the at least a portion of the noise and the portion of the signal that are removed from the input image to generate the filtered image.

In an embodiment, the method 1100 may include training a machine-learning model using a training corpus of images, as at 1116 (e.g., FIG. 5, block 510). In an embodiment, the images include seismic images generated based on data recorded using seismic receivers, as at 1118 (e.g., FIG. 5, block 504). In an embodiment, training the machine-learning model includes labeling one or more portions of the images of the training corpus as representing a signal, as at 1120 (e.g., FIG. 5, block 504).

In another embodiment, the method 1100 also includes generating the training corpus synthetically, as at 1122 (e.g., FIG. 5, blocks 506 and 508). For example, generating the training corpus synthetically may include generating a training image that includes noise, as at 1124 (e.g., FIG. 5, block 506). Generating the training corpus may also include inserting a coherent shape into the training image, as at 1126 (e.g., FIG. 5, block 508), in which individual discrete elements of the training image are labeled as including either noise or a part of the coherent shape, as at 1128 (e.g., FIG. 5, block 508).

In a specific embodiment, the training corpus generated synthetically at 1128 may be a first training corpus, as at 1130. In such embodiment, the method 1100 may further include generating a second training corpus using seismic images generated based on data recorded using seismic receivers, as at 1132 (e.g., FIG. 5, block 502), and training the machine-learning model using the second training corpus, e.g., after training the machine-learning model using the training corpus, as at 1134 (e.g., FIG. 5, block 510).

The method 1100 also includes identifying the at least some of the portion of the signal that is in the residual image (e.g., FIG. 4, block 406), as at 1136. In an embodiment, identifying at least some of the portion of the signal in the residual image includes applying a statistical model to the residual image to identify the at least a portion of the signal, as at 1138 (e.g., FIG. 4, block 406). In an embodiment, identifying the at least some of the portion of the signal in the residual image includes applying a machine-learning model (e.g., the model trained at 1116) to the residual image to identify the at least some of the portion of the signal, as at 1140 (e.g., FIG. 5, block 512).

The method 1100 further includes inserting the portion of the signal identified in the residual image into the filtered image, as at 1142 (e.g., FIG. 4, block 408).

In an embodiment, the method 1100 may further include detecting one or more discontinuities in the filtered image that are or would be caused by inserting the at least some of the at least some of the portion of the signal into the filtered image, as at 1144 (e.g., FIG. 4, block 410). The method 1100 may also include adjusting the filtered image or the at least some of the portion of the signal to mitigate the one or more discontinuities, as at 1146 (e.g., FIG. 4, block 412).

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 12:
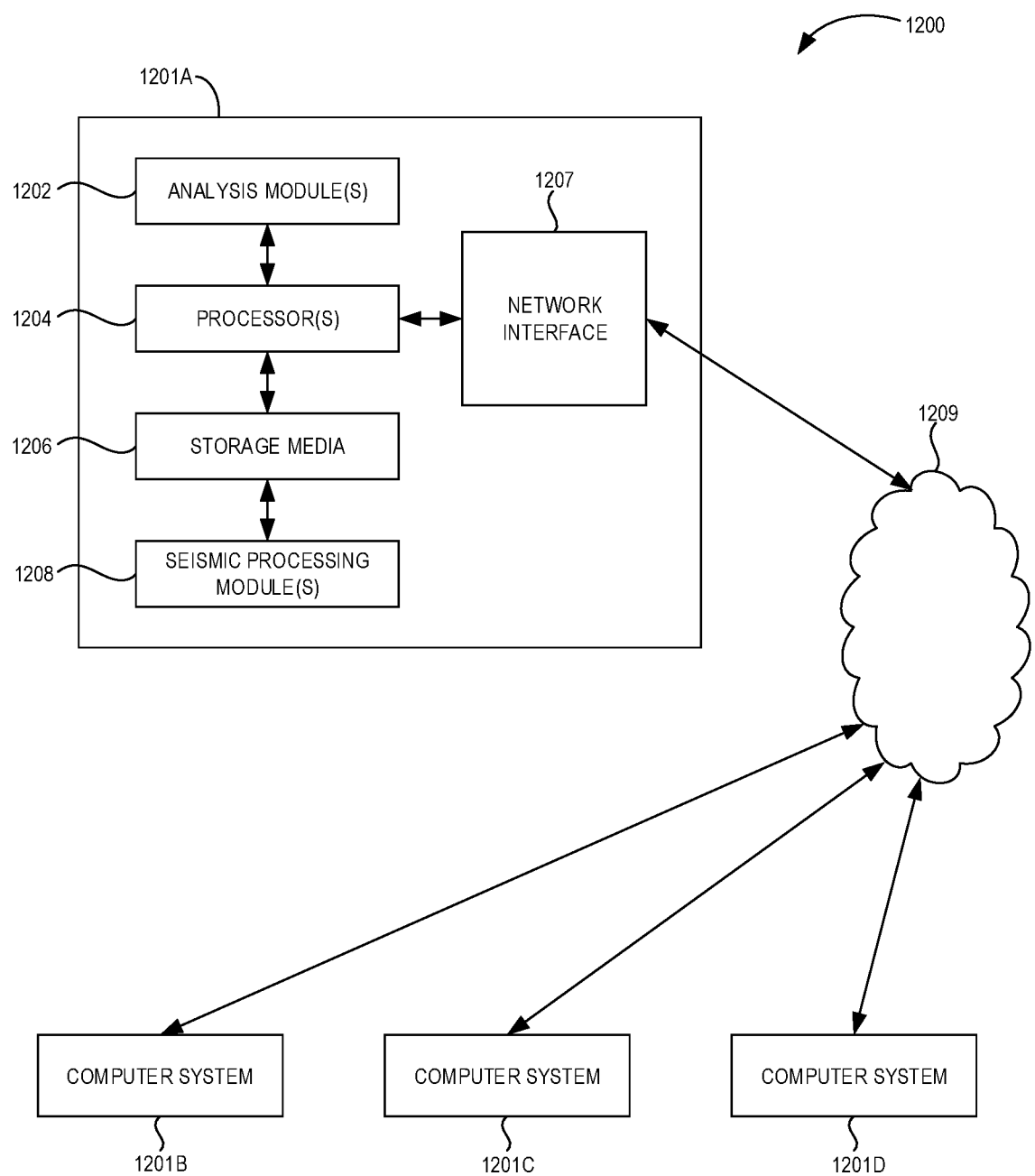
FIG. 12 illustrates an example of a computing system for performing at least a portion of the method, according to an embodiment.

In some embodiments, any of the methods of the present disclosure may be executed by a computing system. FIG. 12 illustrates an example of such a computing system 1200, in accordance with some embodiments. The computing system 1200 may include a computer or computer system 1201A, which may be an individual computer system 1201A or an arrangement of distributed computer systems. The computer system 1201A includes one or more analysis module(s) 1202 configured to perform various tasks according to some embodiments, such as one or more methods disclosed herein. To perform these various tasks, the analysis module 1202 executes independently, or in coordination with, one or more processors 1204, which is (or are) connected to one or more storage media 1206. The processor(s) 1204 is (or are) also connected to a network interface 1207 to allow the computer system 1201A to communicate over a data network 1209 with one or more additional computer systems and/or computing systems, such as 1201B, 1201C, and/or 1201D (note that computer systems 1201B, 1201C and/or 1201D may or may not share the same architecture as computer system 1201A, and may be located in different physical locations, e.g., computer systems 1201A and 1201B may be located in a processing facility, while in communication with one or more computer systems such as 1201C and/or 1201D that are located in one or more data centers, and/or located in varying countries on different continents).

A processor can include a microprocessor, microcontroller, processor module or subsystem, programmable integrated circuit, programmable gate array, or another control or computing device.

The storage media 1206 can be implemented as one or more computer-readable or machine-readable storage media. Note that while in the example embodiment of FIG. 12 storage media 1206 is depicted as within computer system 1201A, in some embodiments, storage media 1206 may be distributed within and/or across multiple internal and/or external enclosures of computing system 1201A and/or additional computing systems. Storage media 1206 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1200 contains one or more seismic processing module(s) 1208. In the example of computing system 1200, computer system 1201A includes the seismic processing module 1208. In some embodiments, a single seismic processing module may be used to perform some or all aspects of one or more embodiments of the methods. In alternate embodiments, a plurality of seismic processing modules may be used to perform some or all aspects of methods.

It should be appreciated that computing system 1200 is only one example of a computing system, and that computing system 1200 may have more or fewer components than shown, may combine additional components not depicted in the example embodiment of FIG. 12, and/or computing system 1200 may have a different configuration or arrangement of the components depicted in FIG. 12. The various components shown in FIG. 12 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1200, FIG. 12), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for processing an image, comprising:
   receiving an input image of actual data comprising a signal and noise, wherein the actual data is recorded by one or more sensors;
   generating a filtered image based on the input image of the actual data by removing at least a portion of the noise from the input image, wherein a portion of the signal is also removed from the input image;
   generating a residual image based on the input image of the actual data, wherein the residual image comprises the at least a portion of the noise and the portion of the signal that are removed from the input image to generate the filtered image;

identifying at least some of the portion of the signal of the actual data that is in the residual image at a pixel-by-pixel or voxel-by-voxel level, wherein the at least some of the portion of the signal is identified using a machine-learning model trained by a plurality of images comprising one or more coherent shapes representing the signal to distinguish between signal and noise in the residual image;

inserting the at least some of the portion of the signal of the actual data identified in the residual image into the filtered image as pixels or voxels;

detecting one or more discontinuities in the filtered image that are or would be caused by inserting the at least some of the portion of the signal into the filtered image, wherein the detecting occurs both before and after the inserting; and adjusting the filtered image or the at least some of the portion of the signal to mitigate the one or more discontinuities.

2. The method of claim 1, wherein generating the filtered image comprises applying a filter to the input image.

3. The method of claim 1, wherein identifying the at least some of the portion of the signal in the residual image comprises applying a statistical model to the residual image to identify the portion of the signal.

4. The method of claim 1, wherein identifying the at least some of the portion of the signal in the residual image comprises applying the machine-learning model to the residual image to identify the portion of the signal.

5. The method of claim 1, further comprising training the machine-learning model using a training corpus of images.

6. The method of claim 5, wherein training the machine-learning model comprises labeling one or more portions of the images of the training corpus as representing at least part of a signal.

7. The method of claim 5, wherein the images are generated based on data recorded using the one or more sensors comprising one or more seismic receivers.

8. The method of claim 5, further comprising generating the training corpus synthetically, comprising:
generating a training image comprising noise;
inserting a coherent shape of the one or more coherent shapes into the training image; and
labeling individual discrete elements of the training image as including either noise or a part of the coherent shape.

9. The method of claim 8, wherein the training corpus comprises a first training corpus, the method further comprising:
generating a second training corpus using seismic images generated based on data recorded using the one or more sensors comprising seismic receivers; and
training the machine-learning model using the second training corpus.

10. The method of claim 1, wherein the input image of the actual data comprises a seismic image representing a subterranean domain of a geological formation, and wherein the filtered image represents the subterranean domain and has a higher signal-to-noise ratio than the input image.

11. A non-transitory computer-readable medium storing instructions that, when executed by at least one processor of a computing system, causing the computing system to perform operations, the operations comprising:
receiving an input image of actual data comprising a signal and noise, wherein the actual data is recorded by one or more sensors;
generating a filtered image based on the input image of the actual data by removing at least a portion of the noise from the input image, wherein a portion of the signal is also removed from the input image;
generating a residual image based on the input image of the actual data, wherein the residual image comprises the at least a portion of the noise and the portion of the signal that are removed from the input image to generate the filtered image;
identifying at least some of the portion of the signal of the actual data that is in the residual image at a pixel-by-pixel or voxel-by-voxel level, wherein the at least some of the portion of the signal is identified using a machine-learning model trained by a plurality of images comprising one or more coherent shapes representing the signal to distinguish between signal and noise in the residual image;
inserting the at least some of the portion of the signal of the actual data identified in the residual image into the filtered image as pixels or voxels;
detecting one or more discontinuities in the filtered image that are or would be caused by inserting the at least some of the portion of the signal into the filtered image, wherein the detecting occurs both before and after the inserting; and
adjusting the filtered image or the at least some of the portion of the signal to mitigate the one or more discontinuities.

12. The medium of claim 11, wherein identifying the at least some of the portion of the signal in the residual image comprises applying a statistical model to the residual image to identify the at least some of the portion of the signal.

13. The medium of claim 11, wherein identifying the at least some of the portion of the signal in the residual image comprises applying the machine-learning model to the residual image to identify the portion of the signal.

14. The medium of claim 11, wherein the operations further comprise training the machine-learning model using a training corpus of images.

15. The medium of claim 14, wherein training the machine-learning model comprises labeling one or more portions of the images of the training corpus as representing at least part of a signal.

16. The medium of claim 14, further comprising generating the training corpus synthetically, comprising:
generating a training image comprising noise;
inserting a coherent shape of the one or more coherent shapes into the training image, wherein the one or more coherent shapes comprise lines, curves, and wave elements; and
labeling individual discrete elements of the training image as including either noise or a part of the coherent shape.

17. The medium of claim 14, wherein the training corpus comprises a first training corpus, the operations further comprising:
generating a second training corpus using seismic images generated based on data recorded using the one or more sensors comprising seismic receivers; and
training the machine-learning model using the second training corpus.

18. A computing system, comprising:
one or more processors; and
a memory system including one or more non-transitory, computer-readable media storing instructions that, when executed by at least one of the one or more processors, cause the computing system to perform operations, the operations comprising:

receiving an input image of actual data comprising a signal and noise, wherein the actual data is recorded by one or more sensors;

generating a filtered image based on the input image of the actual data by removing at least a portion of the noise from the input image, wherein a portion of the signal is also removed from the input image;

generating a residual image based on the input image of the actual data, wherein the residual image comprises the at least a portion of the noise and the portion of the signal that are removed from the input image to generate the filtered image;

identifying at least some of the portion of the signal of the actual data that is in the residual image at a pixel-by-pixel or voxel-by-voxel level, wherein the at least some of the portion of the signal is identified using a machine-learning model trained by a plurality of images comprising one or more coherent shapes representing the signal to distinguish between signal and noise in the residual image;

inserting the at least some of the portion of the signal of the actual data identified in the residual image into the filtered image as pixels or voxels;

detecting one or more discontinuities in the filtered image that are or would be caused by inserting the at least some of the portion of the signal into the filtered image, wherein the detecting occurs both before and after the inserting; and adjusting the filtered image or the at least some of the portion of the signal to mitigate the one or more discontinuities.

\* \* \* \* \*